United States Patent
Joyce, Jr. et al.

(10) Patent No.: US 6,340,211 B1
(45) Date of Patent: Jan. 22, 2002

(54) DUAL STATION AIR BRAKE CONTROL

(75) Inventors: Michael J. Joyce, Jr., Jefferson Boro, PA (US); Charles L. Crawford, Baldwinsville, NY (US); Daniel J. Wolf, Pittsburgh, PA (US); David J. Pcsolar, Irwin, PA (US); Winslow K. Duff, Export, PA (US)

(73) Assignee: Westinghouse Air Brake Company, Wilmerding, PA (US)

( * ) Notice: Subject to any disclaimer, the term of this patent is extended or adjusted under 35 U.S.C. 154(b) by 0 days.

(21) Appl. No.: 08/922,426

(22) Filed: Sep. 3, 1997

(51) Int. Cl.[7] ................................................. B60T 8/32
(52) U.S. Cl. ........................................ 303/191; 303/16
(58) Field of Search ............................. 303/3, 191, 15, 303/16, 17, 20, 14, 6.01, 7; 188/106 P

(56) References Cited

U.S. PATENT DOCUMENTS

| | | | | |
|---|---|---|---|---|
| 3,572,847 A | * | 3/1971 | Luft | 180/321 |
| 3,743,064 A | * | 7/1973 | Luft | 477/2 |
| 3,845,629 A | * | 11/1974 | Luft | 60/719 |
| 4,181,369 A | * | 1/1980 | Balukin et al. | 303/16 |
| 5,718,487 A | * | 2/1998 | Roselli et al. | 303/14 |

* cited by examiner

*Primary Examiner*—Christopher P. Schwartz
*Assistant Examiner*—Melanie Talavera
(74) *Attorney, Agent, or Firm*—James Ray & Associates

(57) ABSTRACT

A method of changing between two operator stations in a cab of a locomotive for controlling the brakes of the locomotive and of a train of railway cars connected to the locomotive. The stations each have at least one brake handle and an associated selector switch, with each of the switches being electrically connected to a brake control computer. The method includes stopping the train if the train is in motion and placing the brake valve handles of the stations in a position to apply the brakes at full service. One of the operator stations is selected as an active station for braking the train while the other station is selected to be inactive. Signals are directed from the selector switches at the operator stations to the computer, the signals indicating which of the two stations is active and inactive. The computer is provided with the software that accepts a valid transition to the station selected by the operator as the active station.

11 Claims, 2 Drawing Sheets

DUAL STATION AIR BRAKE CONTROL

FIELD OF INVENTION

Figure 1A:
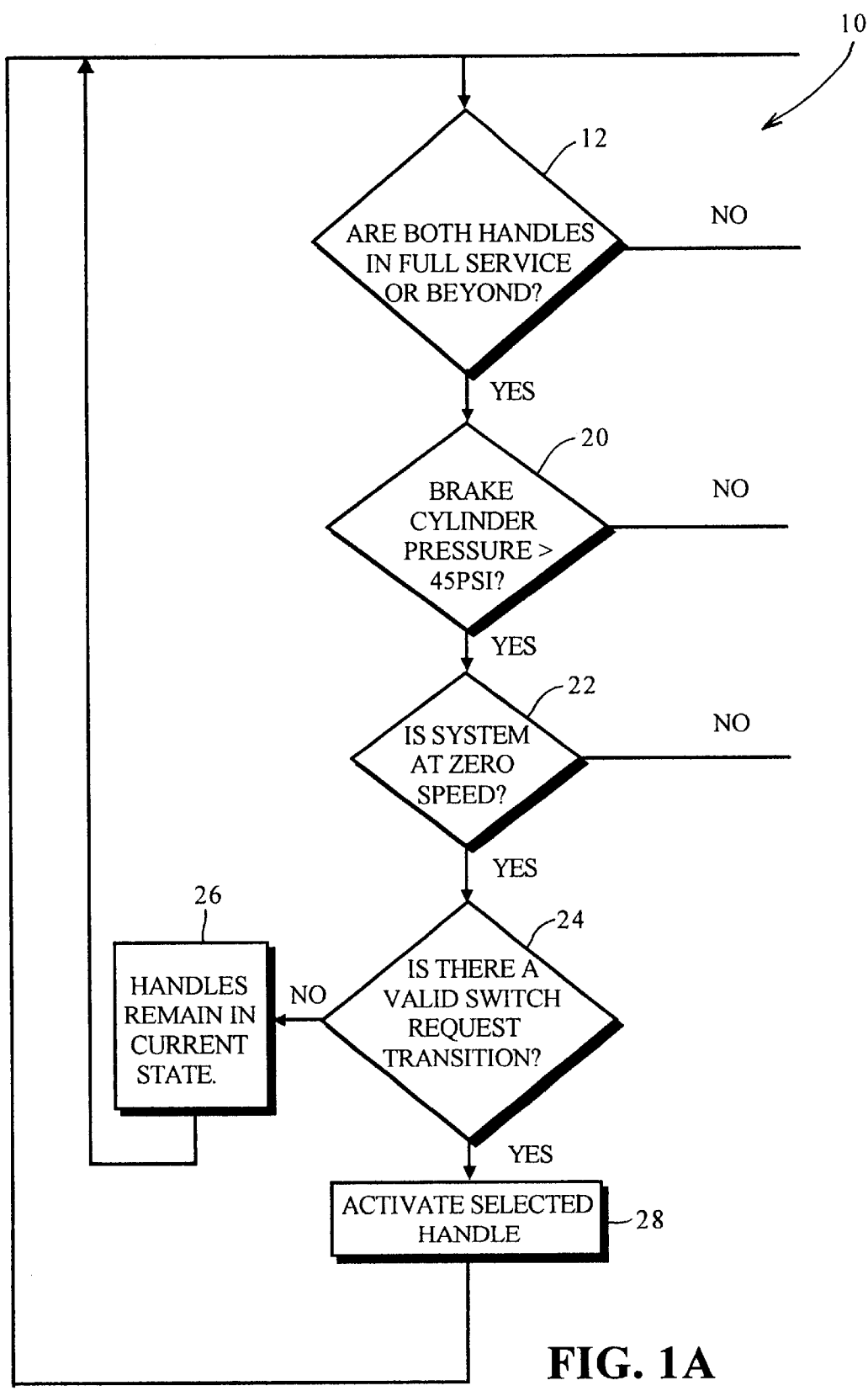

The present invention relates generally to brake control apparatus on locomotives, and more particularly to two operator brake valve handle stations in the cab of a locomotive that are operable exclusively of one another.

BACKGROUND OF THE INVENTION

The cab of locomotive generally has two brake valve handle stations providing service and emergency braking. One of the handle stations is an "independent" handle and the other is an "automatic" handle. With the independent handle, an operator/engineer applies and releases brakes of the locomotive only. With the automatic handle, the operator applies and releases the brakes not only of the locomotive but also of each car of a train of cars connected to the locomotive. Each handle directly operates a valve located at each station, the valve being effective to operate the brakes using pressurized air contained in main reservoirs located on the locomotive.

In addition, each handle station provides analogue encoded signals to computers for braking, such signals indicating the amount of brake cylinder pressure called for by the brake handle position, as manually operated by the operator/engineer.

SUMMARY OF THE INVENTION

The present invention is directed to providing a locomotive cab with two brake handle stations and one brake control computer. The computer is connected and programmed to received coded input brake signals from both stations but in a manner that permits only one station to function at a time as the "active" station while the other station remains dormant or inactive. The computer processes signal selection of the active station based upon manual handle position selection by the operator/engineer. As an option, the inactive station can report emergency requests to the computer, thereby allowing emergency action to be initiated from either station.

To change from one operator station to the other the software of the computer requires the locomotive to be stationary and the brakes of the locomotive and cars to be applied at full service or beyond. To prevent an accidental undesirable release of the brakes at switch-over or transition from a currently active to a currently inactive state the computer requires both stations to be in a full brake service position.

The brake cylinders of the locomotive and cars must also be in full service, as bailoff of the locomotive brakes invalidates the change over procedure. (Bailoff refers to an automatic release of the locomotive brake to care for slack between cars of the train).

The software of the computer interlocks handle selector inputs to the computer so that transition to a valid state can take place when the train is stopped, with brake cylinder pressure being at full service or beyond and both brake valve handles being at full service position or beyond. This interlock insures that the change over always coincides with an operator request.

OBJECTIVES OF THE INVENTION

It is therefore a primary objective of the invention to provide dual brake operator stations in the cab of a locomotive, with control of train brakes being limited to only one station.

It is a Further objective of the invention to insure that change over between brake handle stations occurs in accordance with operator instructions.

Yet another objective of the invention is to interface two brake handle selector switches with a single computer in a locomotive cab.

A further objective is to insure disabling of an inactive handle station in a locomotive cab having two brake handle stations such that an active handle unit will function as it the cab has only a single brake valve handle and operator station.

Another objective of the invention is to change operating modes in a locomotive cab as one unit. For example, if an operator changes from LEAD/CUT-in to LEAD/CUT-out at one station and then changes from ore station to the other, the cab will be LEAD/CUT-out at the other station as well.

THE DRAWING

The objectives and advantages of the invention will be better understood from the following detailed description and the accompanying drawing, the sole FIGURE of which is a flow diagram showing the dual station and brake control functions of the invention.

DESCRIPTION OF PRESENTLY PREFERRED EMBODIMENT

Referring now to the drawing, a brake control system 10 is shown in which the functions of the system are indicated by test and process boxes (the test boxes being diamond shaped while the process boxes are rectangular). The functions are performed by a general purpose computer (not otherwise shown) located in the cab of a locomotive using software that functions in the manner of the boxes in the drawing, presently to be explained.

The cab is also provided with two brake valve handle stations or units (not shown) and two selector switches (not shown) respectively operated by the brake handles at the stations and operatively connected to the computer. Preferably such selector switches are electrically connected to the computer. Such selector switches may also be connected to the computer by radio communication. The computer decodes the information (signals) from the selector switches and uses the same in the manner presently to be described. When a station is selected by the operator/engineer as the active station, the selector switch at the selected station supplies a high level DC voltage, such as 74 volts, to the computer. In this manner, the computer is informed of the station selected. This is the station the computer reads for the active station, but the high level voltage is reduced to a low level DC signal, such as five volts, for actual use by the computer.

When the selection is made, the selector switch at the selected station also inputs to the computer a digital low or zero level voltage signal, which signal also indicates to the computer the location of the active station, while the inactive station inputs to the computer a relatively high level voltage signal. This logic is employed to insure the availability of emergency brake circuits and service in the absence of an "active" signal, which signal, as discussed above, is "low" or zero. For example, in the event the high level 74 volt signal is lost or the selector switch itself breaks, a resulting zero volt condition exists. Such a "condition" allows both emergency circuits to be active and available while maintaining the last active station active as the emergency circuits still "see" a zero voltage level. With the reverse of such logic, the emergency circuits would "see" a voltage level that would indicate an active, operating brake valve handle and station even though the station is inactive or disabled.

In the event both stations are indicated as being active or inactive, which is a fault condition, when the brake system of the train is powered up before movement of the train, the software of the computer selects and will accept commands from only a "primary" station. Similarly, if during operation of the train at zero speed, and both stations show an active or inactive position of the selector switches, which is also a fault condition, any switch-over made by the operator will not occur, with brake operations in the cab continuing with the originally selected station.

Further, the software of the computer is preferably written to provide output instructions to enable the emergency backup circuit at the selected active station and to disable the emergency brake circuit for the inactive station.

Each operator/brake handle station also provides two analogue signals to the computer representing, respectively, the above described automatic service brake instruction and the independent service brake instruction.

Figure 1B:
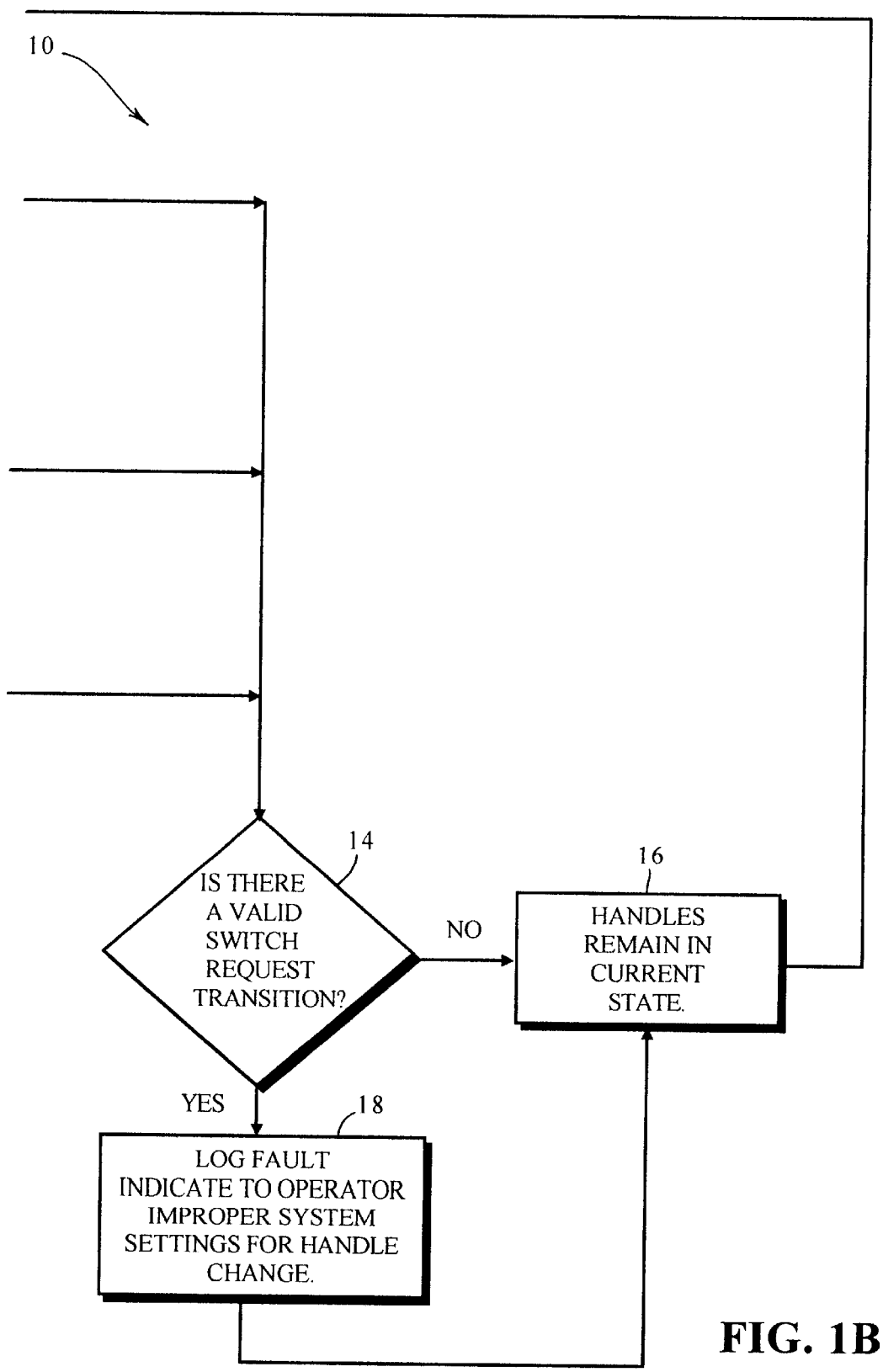

Returning to the sub figures of the drawing, the software of the computer operates in the following manner. The question is asked by the software, as represented by a box 12 (FIG. 1A) in the drawing, "are both station handles in a full service or beyond position"? If the answer is "no", the computer asks at box 14" (FIG. 1B) is this a valid request for transition (change over) from an active station to an inactive station. If the answer is "no", the station selection remains in the current state (box 16) FIG. 1B. If the answer is "yes" at box 14, the computer logs a fault, since the answer for the "full service" question at box 12 is "no" and indicates to the operator (at box 18) in FIG. 1B that there are improper handle settings for a station change.

Returning to box 12, and FIG. 1, if the answer is "yes" to the question posed at 12, the software of the computer queries brake cylinder pressure of the locomotive (box 20). The system of the invention will not permit a change in operator stations if brake cylinder pressure is not at approximately 90 percent of full service or beyond. A typical full pressure is on the order of 50 psi and is measured by a readback transducer located in the locomotive cab and connected to receive brake cylinder pressure.

Hence, at box 20 if the answer is "no", the system of 10 functions in the manner described above with the "no" answer at box 12.

If the answer is "yes" at box 20, the system asks at box 22 if the train is at zero speed. If again the answer is "no", the system functions in the manner of the above "no" answers from boxes 12 and 20. If the answer is "yes" at box 22, the software asks at box 24 if this is a valid request for station transition. If the answer is "no". handle selection remains in its current state at 26, as required by the software. If the answer is "yes" at 24, the software activates the station of the selected handle at 28, and deactivates the other handle and station.

In this manner, no change of stations can be made if the above requirements in boxes 12, 20 and 22 are not met. And, change over is allowed to occur only in terms of an explicit instruction from an operator/engineer.

As noted earlier, the invention permits the operating mode in the cab to be changed as a unit, i.e., if an operator changes from LEAD/CUT-in to LEAD/CUT-out at one station, and then changes stations, the software of the cab computer orders LEAD/CUT-out at the newly selected station as well.

In a LEAD/CUT-in mode, the brake equipment of a train allows the train operator to direct control of the train through both the automatic and the independent brake handles. This gives the operator control over the brakes of both the locomotive(s) and the rail cars. In a Lead/Cut-out mode, the brake equipment allows the train operator to provide brake control only through the independent brake handle, which gives the operator control over the brakes of the locomotive only.

While the presently preferred embodiment for carrying out the instant invention has been set forth in detail according to the Patent Act, those persons skilled in the brake control system art to which this invention pertains will recognize various alternative ways of practicing the invention without departing from the spirit and scope of the claims appended hereto.

We claim:

1. A method of changing between two operator stations located in a cab of a locomotive for controlling brakes of such locomotive and a train of railway cars connected to such locomotive, said stations each having brake valve handles and an associated selector switch, with each of said switches being operatively connected to a brake control computer, the method comprising:

stopping the train if the train is in motion determining that said brakes are set;

selecting one of the operator stations as an active station for braking the train while the other station is chosen to be inactive, directing signals from the selector switches at the operator stations to the computer, said signals indicating which one of the two stations is active and inactive, and providing the computer with software that accepts a valid transition to the station selected by an operator as the active station, the step of selecting the active station including manually operating a switching device operatively connected between the computer and said selector switches said manual operation informing the computer of the stations selected respectively for active and inactive status, with said switching device being connected for radio communication between the computer and said selector switches.

2. The method of claim 1, wherein said step of determining that said brakes are set includes placing the brake valve handles of the stations in a position to apply the brakes at full service.

3. The method of claim 1, further including, providing the computer with software that interlocks inputs from the selector switches while the train is moving such that the active station cannot be disabled while the train is in motion.

4. The method of claim 1, wherein said switching device is electrically connected between the computer and said selector switches.

5. The method of claim 1, further including producing two analogue signals at each of the operator stations for input to the computer, said two analogue signals representing respectively an automatic service brake instruction and a independent service brake instruction.

6. The method of claim 1, including:

providing each of said operator stations with an emergency power loss circuit, and permitting said circuits to remain active if a low or zero voltage is directed to the computer from one or both of said operator stations.

7. The method of claim 1, further including:

providing each of said operator stations with a power loss bailoff circuit, and permitting said circuits to remain in an active status if the computer receives a low or zero voltage signal from one or both stations.

8. The method of claim 1, further including providing the computer with software that will choose one of said operator stations as a primary station for operating the brakes of the locomotive and cars of the train when the brakes are initially activated if both selector switches at the operator stations indicate an active or inactive status.

9. The method of claim 1, further including providing the computer with software that will continue with an originally active selector switch if, at zero speed of the train, both of said selector switches indicate an active or inactive status.

10. A method of changing between two operator stations located in a cab of a locomotive for controlling brakes of such locomotive and a train of railway cars connected to such locomotive, said stations each having brake valve handles and an associated selector switch, with each of said switches being operatively connected to a brake control computer, the method comprising:

stopping the train if the train is in motion determining that said brakes are set;

selecting one of the operator stations as an active station for braking the train while the other station is chosen to be inactive, directing signals from the selector switches at the operator stations to the computer, said signals indicating which one of the two stations is active and inactive, providing the computer with software that accepts a valid transition to the station selected by an operator as the active station, producing digital signals at the two operator stations indicative of the active and inactive status of said stations, and directing said digital signals to the computer, with the signal directed from the active station to the computer being a relatively low level voltage while the signal directed from the inactive station to the computer is a relatively high level voltage.

11. A method of changing between two operator stations located in a cab of a locomotive for controlling brakes of such locomotive and a train of railway cars connected to such locomotive, said stations each having brake valve handles and an associated selector switch, with each of said switches being operatively connected to a brake control computer, the method comprising:

stopping the train if the train is in motion determining that said brakes are set;

selecting one of the operator stations as an active station for braking the train while the other station is chosen to be inactive, directing signals from the selector switches at the operator stations to the computer, said signals indicating which one of the two stations is active and inactive, and providing the computer with software that accepts a valid transition to the station selected by an operator as the active station, with the computer reporting a transition to an active status as a fault condition when (1) the train is not stationary, (2) the brakes are not at full service or beyond and (3) the brake valve handles at both operator stations are not at full service or beyond.

* * * * *